(12) United States Patent
Scheibenzuber

(10) Patent No.: US 10,132,654 B2
(45) Date of Patent: Nov. 20, 2018

(54) ERROR COMPENSATION IN AN ANGLE SENSOR

(71) Applicant: Infineon Technologies AG, Neubiberg (DE)

(72) Inventor: Wolfgang Georg Scheibenzuber, Vilsbiburg (DE)

(73) Assignee: Infineon Technologies AG, Neubiberg (DE)

( * ) Notice: Subject to any disclaimer, the term of this patent is extended or adjusted under 35 U.S.C. 154(b) by 894 days.

(21) Appl. No.: 13/938,854

(22) Filed: Jul. 10, 2013

(65) Prior Publication Data

US 2015/0019152 A1 Jan. 15, 2015

(51) Int. Cl.
*G01D 5/244* (2006.01)

(52) U.S. Cl.
CPC ................ *G01D 5/2448* (2013.01)

(58) Field of Classification Search
CPC .. G01B 21/22; G01D 5/24452; G01D 5/2448; G01D 5/145
See application file for complete search history.

(56) References Cited

U.S. PATENT DOCUMENTS

| | | | |
|---|---|---|---|
| 6,496,784 B1 | 12/2002 | Dukart | |
| 7,203,618 B2 | 4/2007 | Hammerschmidt | |
| 2006/0042074 A1* | 3/2006 | Stork | ........... F01L 1/34 29/622 |
| 2012/0078560 A1* | 3/2012 | Satou | ........... G01D 5/2449 702/94 |

OTHER PUBLICATIONS

Infineon, Data Sheet, TLE5012B: "Angle Sensor: GMR-Based Angle Sensor" V1.1, Jan. 2012, © 2012, 49 pages.

* cited by examiner

*Primary Examiner* — Kyle R Quigley
(74) *Attorney, Agent, or Firm* — Eschweiler & Potashnik, LLC

(57) ABSTRACT

Embodiments provide a method for determining sine or cosine correction values for an error compensation in an angle sensor. At least three pairs of values for at least three rotation angle values of an angle sensor are detected. Each pair of values includes a rotation angle value and an associated measurement signal value. The associated measurement signal value includes a sine component and a cosine component. The sine correction value for an offset error of the sine components of the measurement signal values is determined by adding the sine components of two detected measurement signal values. The cosine correction value for an offset error of the cosine components of the measurement signal values is determined by adding the cosine components of two detected measurement signal values. The sine correction value for the offset error of the sine components or the cosine correction value for the offset error of the cosine components is provided for error compensation.

20 Claims, 9 Drawing Sheets

ERROR COMPENSATION IN AN ANGLE SENSOR

TECHNICAL FIELD

The invention relates to an automatic calibration routine for magnetic angle sensors with a limited angle range. Embodiments relate to a method for determining sine or cosine correction values for an error compensation in an angle sensor. Other embodiments relate to a method for correcting a sine or cosine offset error in measurement signal values of an angle sensor. Further embodiments relate to a method for determining amplitude correction values for an error compensation in an angle sensor. Further embodiments relate to a method for determining sine or cosine correction values and amplitude correction values for an error compensation in an angle sensor. Further embodiments relate to a method for correcting an amplitude error in measurement signal values of an angle sensor. Some embodiments relate to an angle sensor. Other embodiments relate to a rotation angle sensor arrangement.

BACKGROUND

Angle sensors can be used for a variety of applications, such as measuring a steering angle or an opening angle. Some magnetic angle sensors comprise a source of a magnetic field, e.g. a permanent magnet providing a magnetic field and a sensor element located within the magnetic field, configured to sense the orientation of the sensor element within the magnetic field. The sensor is configured to provide measurement signal values, comprising a sine component and a cosine component. Measurement signal values of angle sensors comprise measurement errors.

SUMMARY

Embodiments provide a method for determining sine or cosine correction values for an error compensation in an angle sensor. The method comprises a detection of at least three pairs of values for at least three rotation angle values of an angle sensor, wherein each pair of values includes a rotation angle value and an associated measurement signal value. The associated measurement signal value includes a sine component and a cosine component. The sine correction value for an offset error of the sine components of the measurement signal values is determined by adding the sine components of two detected measurement signal values. A cosine correction value for an offset error of the cosine components of the measurement signal values is determined by adding the cosine components of two detected measurement signal values. The sine correction value for the offset error of the sine components or the cosine correction value for the offset error of the cosine components is provided for error compensation.

Further embodiments provide a method for correcting a sine or a cosine offset error in measurement signal values of an angle sensor. The method comprises a detection of at least three pairs of values for at least three rotation angle values of an angle sensor. Each pair of values includes a rotation angle value and an associated measurement signal value. The associated measurement signal value includes a sine component and a cosine component. A sine correction value for an offset error of the sine components of the measurement signal values is determined by adding the sine components of two detected measurement signal values. A cosine correction value for an offset error of the cosine components of the measurement signal values is determined by adding the cosine components of two detected measurement signal values. The sine correction value for the offset error of the sine components or the cosine correction value for the offset error of the cosine components is provided for error compensation. A pair of current values for a current rotation angle value of the angle sensor is detected, said pair of current values includes a current rotation angle value and an associated current measurement signal value. The associated current measurement signal value includes a current sine component and a current cosine component. The sine or cosine offset error of the current measurement signal value is corrected by subtracting the sine correction value for the offset error of the sine components of the measurement signal values from the current sine component of the current rotation angle value or by subtracting the cosine correction value for the offset error of the cosine component of the measurement signal values from the current cosine component of the current rotation angle value.

Further embodiments provide a method for determining amplitude correction values for an error compensation in an angle sensor. The method comprises a detection of at least two pairs of values for at least two rotation angle values of an angle sensor, wherein each pair of values includes a rotation angle value and an associated measurement signal value. The associated measurement signal value includes a sine component and a cosine component. An amplitude correction value for compensating the amplitude error of the measurement signal values is determined by forming a quotient based on the sine component of a measurement signal value and the cosine component of a measurement signal value. The amplitude correction value for the amplitude error is provided for error compensation.

Further embodiments provide a method for determining sine or cosine correction values and amplitude correction values for an error compensation in an angle sensor. At least four pairs of values for at least four rotation angle values of an angle sensor are detected, each pair of values including a rotation angle value and an associated measurement signal value. The associated measurement signal value includes a sine component and a cosine component. A sine correction value for an offset error of the sine components of the measurement signal values is determined by adding the sine components of two detected measurement signal values. A cosine correction value for an offset error of the cosine components of the measurement signal values is determined by adding the cosine components of two detected measurement signal values. An amplitude correction value for compensating the amplitude error of the measurement signal values is determined by forming a quotient based on the sine component of a measurement signal value and the cosine component of a measurement signal value. The sine correction value for the offset error of the sine components, the cosine correction value for the offset error of the cosine components or the amplitude correction value for the amplitude error is provided for error compensation.

Further embodiments provide a method for correcting an amplitude error in measurement signal values of an angle sensor. The method comprises a detection of at least two pairs of values for at least two rotation angle values of an angle sensor. Each pair of values includes a rotation angle value and an associated measurement signal value. The associated measurement signal value includes a sine component and a cosine component. An amplitude correction value for compensating the amplitude error of the measurement signal values is determined by forming a quotient based on the sine component of a measurement signal value and the cosine component of a measurement signal value. The amplitude correction value for the amplitude errors is provided for error compensation. A pair of current values for a current rotation angle value of the angle sensor is detected, said pair of current values includes a current rotation angle value and an associated current measurement signal value. The associated current measurement signal value includes a current sine component and a current cosine component. The amplitude error of the current measurement signal value is corrected by dividing the current sine component of the current measurement signal value or the current cosine component of the current measurement signal value by the amplitude correction value for the amplitude error of the measurement signal values.

Further embodiments provide a rotation angle sensor comprising a processing unit for performing error compensation in angle sensors.

BRIEF DESCRIPTION OF THE DRAWINGS

Embodiments are described herein making reference to the appended drawings.

FIG. 11b shows a schematic diagram of the closed throttle valve according to the embodiment of FIG. 11a.

DETAILED DESCRIPTION

Figure 1:
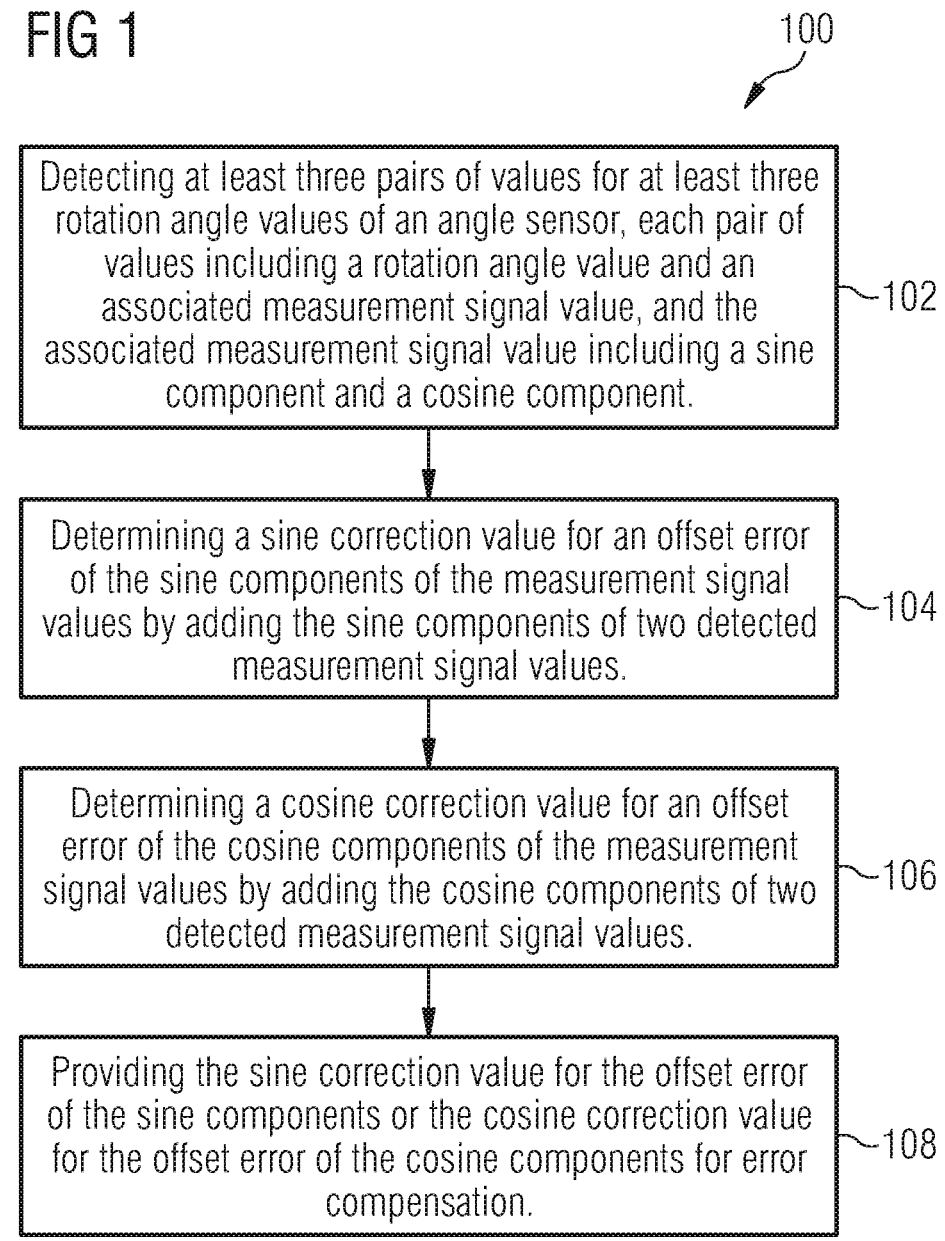
FIG. 1 shows a flowchart of a method for determining sine or cosine correction values for an error compensation in an angle sensor according to an embodiment.

Equal or equivalent elements or elements with equal or equivalent functionality are denoted in the following description by equal or equivalent reference numerals.

In the following description, a plurality of details are set forth to provide a more thorough explanation of embodiments. However, it will be apparent to those skilled in the art that embodiments may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 2:
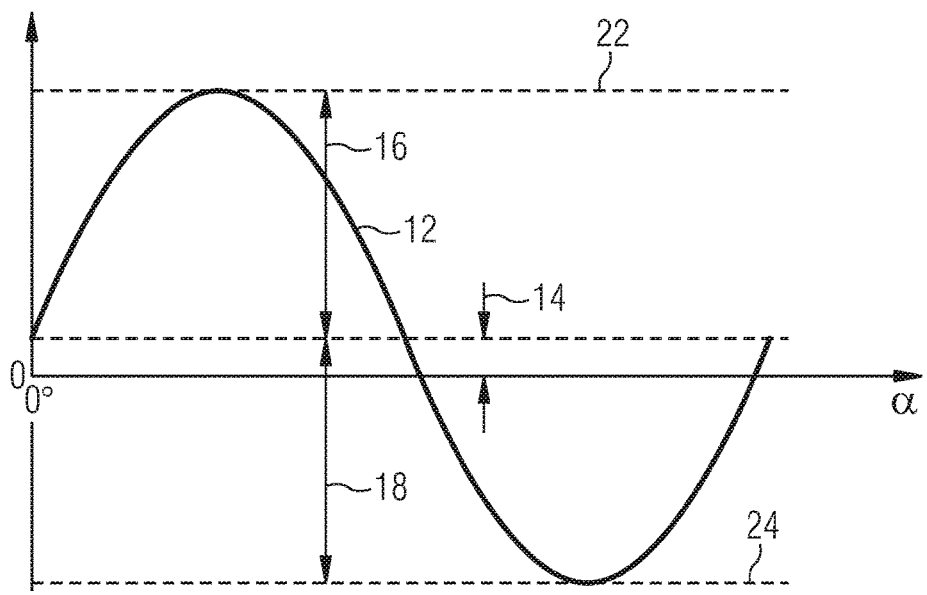
FIG. 2 shows a graph of an sine component of a measurement signal value of an angle sensor provided by an angle sensor, which contains errors.
Figure 3:
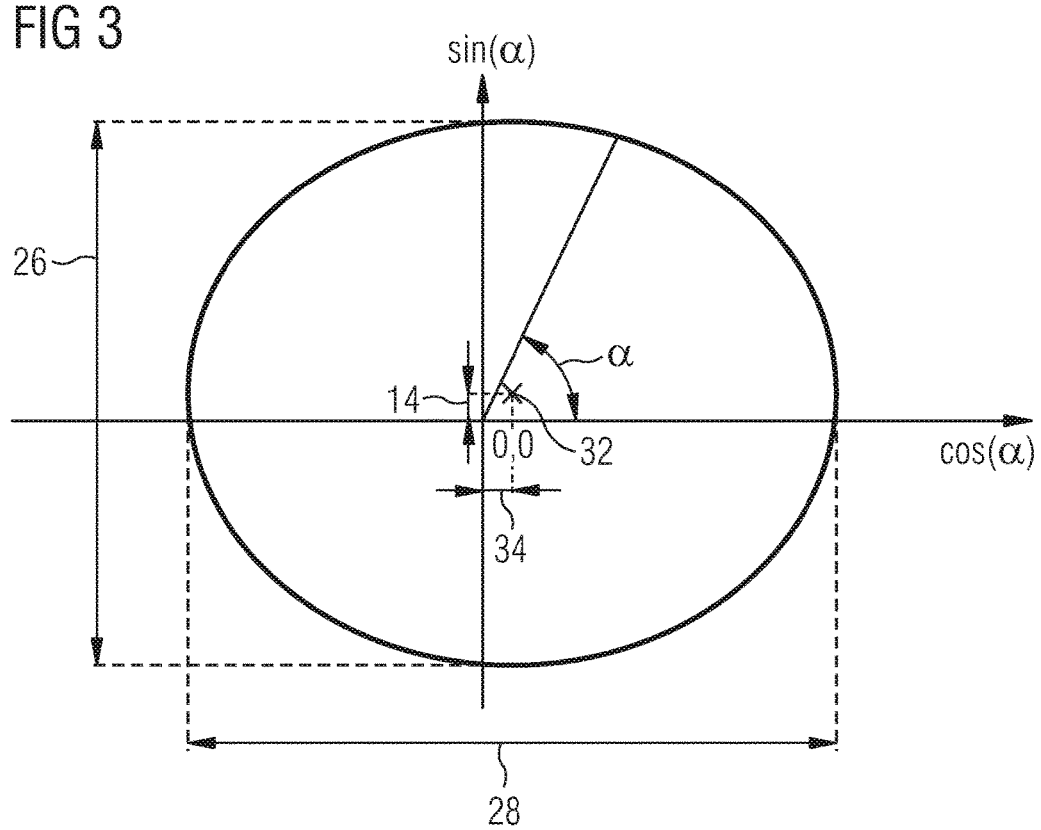
FIG. 3 shows a graph illustrating a case for magnetic angle sensors, wherein the sine and cosine components have different amplitudes and a unity circle representing the sine and cosine components of the measurement signal values is altered to an ellipse.
Figure 6:
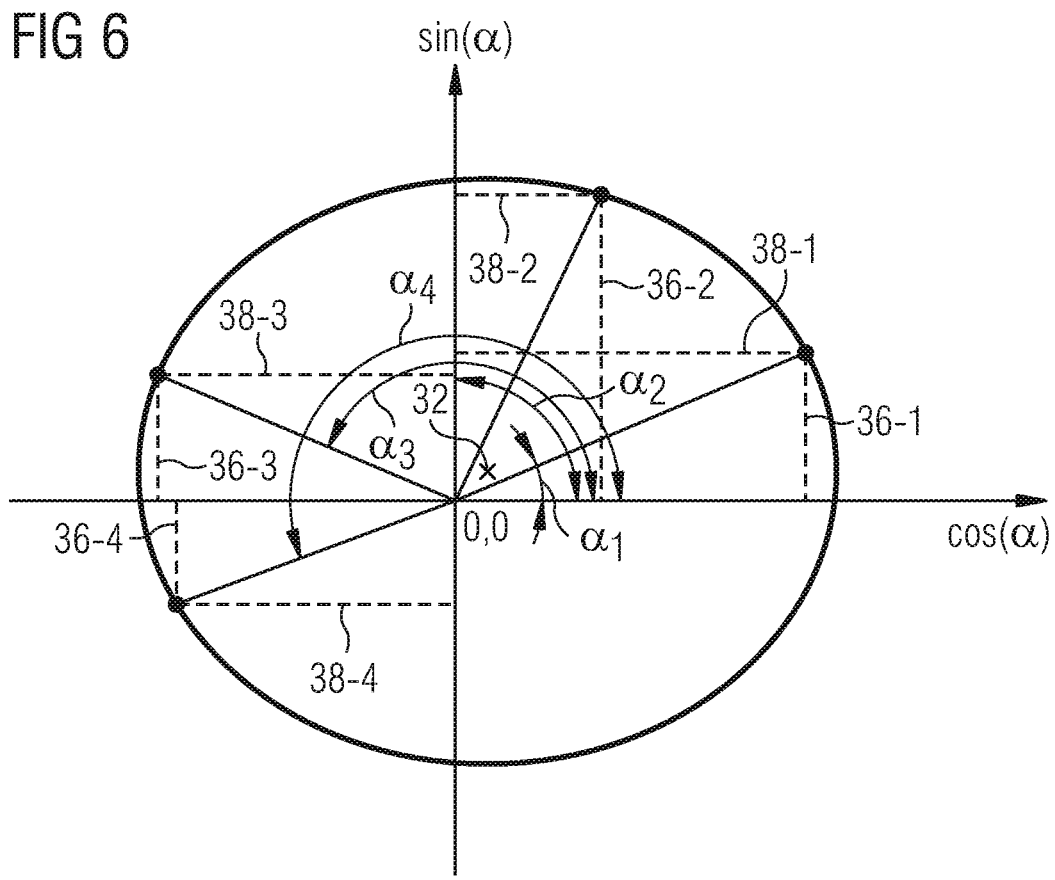
FIG. 6 shows a determination rule for determining four rotation angle values and the associated measurement signal values according to an embodiment.

In the following, an embodiment of a method for determining sine or cosine correction values for an error compensation in an angle sensor is described based on the illustrations in FIGS. 1, 2, 3 and 6. FIG. 1 shows a flowchart of a method for determining sine or cosine correction values for an error compensation in an angle sensor. FIG. 2 shows a flowchart of a graph of an error-prone sine component of a measurement signal value, wherein the sine component comprises an offset error leading a positive amplitude and a negative amplitude to be centered around the value of the offset error instead of being centered around zero. FIG. 3 shows a schematic graph illustrating an amplitude error as a range of all measured sine components comprising a difference from a range describing a range of all measured cosine components. FIG. 6 shows a determination scheme for determining four rotation angle values and the associated measurement signal values.

FIG. 1 shows a flowchart of a method 100 for determining sine or cosine correction values for an error compensation in an angle sensor. At 102 at least three pairs of values for at least three rotation angle values of an angle sensor are detected according to a scheme described in FIG. 6, wherein each pair of values includes a rotation angle value and an associated measurement signal value. For determining the sine and/or cosine correction values for the sine and/or cosine offset error, the sine and/or cosine components at three test angles $\alpha_1$, $\alpha_3$ and $\alpha_4$ of FIG. 6 are used, as $\alpha_1$ and $\alpha_3$ comprise a symmetry with respect to the cosine components and $\alpha_3$ and $\alpha_4$ comprise a symmetry with respect to the sine components, as it is described later on. An influence of an offset error on a sine component of a measurement signal value is described in FIG. 2.

The associated measurement signal value includes a sine component and a cosine component. At 104 a sine correction value for an offset error of the sine components of the measurement signal values is determined by adding the sine components of two detected measurement signal values. At 106 a cosine correction value for an offset error of the cosine components of the measurement signal values is determined by adding the cosine components of two detected measurement signal values. At 108 the sine correction value for the offset error of the sine components or the cosine correction value for the offset error of the cosine components is provided for error compensation.

Determining the sine correction value for the offset error of the sine components of the measurement signal values, determining the cosine correction value for the offset error of the cosine components of the measurement signal values respectively is done by adding two values for each correction value. With respect to multiplications or divisions, such an addition requires a considerable minor computational power. In addition, the method 100 is applicable on the fly during an operation of the angle sensor and without any additional measures or reference signals. Due to its low computational expenditure, the method may easily be integrated both on the sensor itself and on a signal-processing microcontroller.

In case to the sine and cosine error, an amplitude error which may be contained by the measurement signal values, and which is described in FIG. 3 leads the values of the sine and cosine components showing different maximum amplitudes. To determine an amplitude correction value in addition to the sine and/or cosine correction values, for a compensation of the amplitude error of the measurement signal values, at least a fourth test angle of the angle sensor is detected, denoted as $\alpha_2$ in FIG. 6. The amplitude correction value for the amplitude error is determined by dividing a sine component 36-2 by a cosine component 38-1. As the cosine component 36-2 is detected for determining the cosine correction value, the sine component 36-2 and therefore the measurement signal values of the test angle $\alpha_2$ are to be detected in addition to the measurement signal values for determining the correction values for the sine and/or cosine errors.

The method may be applied, for example, in an angle sensor which is based on the Anisotropic Magneto Resistance (AMR) and is employed for measuring the position of a throttle valve in an internal combustion engine.

The method provides correction values which can be used for an error compensation in angle sensors, for example in an automatic calibration routing and is usable in angle sensors, wherein for application-related reasons no complete rotation of the sensing element relative to the source of the magnetic field, e.g. a permanent magnet is possible and, thus, the range of angles to be measured is limited. On the basis of the AMR, of the GMR (Giant Magneto Resistance), of the TMR (Tunnel Magneto Resistance) and/or of the Hall effect said sensors measure the sine and cosine component of the direction of a magnetic field at the location of the sensor, which is typically generated by a rotatable permanent magnet and output the direction as a sine component and a cosine component of a measurement signal. The angle of the magnetic field is calculated from the sine and cosine components measured. Due to fluctuations in manufacturing and to temperature and aging effects, two essential cases of interference occur in the sine and cosine components which lead to an error in angle determination. The first essential case of interference leads the signals of the sine and cosine components not to be centered around zero and therefore to show a constant offset error. The second essential case of interference leads the signals of the sine and cosine components showing a different amplitude from each other and therefore to show an amplitude error.

FIG. 2 shows a graph 12 of an error-prone sine component measured by an angle sensor. The abscissa of the diagram shows an angle $\alpha$ of the angle sensor, the ordinate displays a measured signal strength. The graph 12 shows a presence of the first essential case of interference, wherein the signal is not centered around zero and wherein there is a constant offset. The graph 12 comprises an offset 14, which leads the graph 12 comprising a positive amplitude 16 and a negative amplitude 18 to be centered around the value of the offset 14 instead of being centered around zero. Thus, an amount of a maximum amplitude 22 and an amount of a minimum amplitude 24 of the graph 12 comprise different values on the ordinate.

In the following a second essential case of interference is described making reference to FIG. 2 showing a flowchart of a graph of an error-prone sine component of a measurement signal value, wherein the sine component comprises an offset error leading a positive amplitude and a negative amplitude to be centered around the value of the offset error instead of being centered around zero.

FIG. 3 shows a graph illustrating a presence of an offset error and of the second essential case of interference for magnetic angle sensors, wherein the sine and cosine components have different amplitudes. The abscissa of the graph depicted in FIG. 3 displays the value of a cosine component of a measurement signal value of an angle sensor for an angle $\alpha$, wherein the ordinate of the graph shows the corresponding sine component of the measurement signal value. In case a range 26 describing a range of all measured sine components comprises a difference from a range 28 describing a range of all measured cosine components, each with respect the sum of all angles $\alpha$, an amplitude error is present within the angle sensor. In a theoretic angle sensor, the range 26 is equal to the range 28, as in the theoretic case sine values and cosine values form a unity circle, wherein a realistic case as shown in FIG. 3 shows an ellipse of the sine and cosine values. Thus, the ranges of the amplitudes of the sine and cosine components are not the same.

In addition, a center point 32 of the ellipse is displaced from zero. The value of the displaced center point 32 with respect to the ordinate of the graph corresponds to the offset error 14 of the sine values, shown in FIG. 2. A value of the displaced center point 32 on the abscissa of the graph corresponds to an offset error 34 of the cosine values.

In particular, the inventive method can be applied for sensors having limited ranges of angles for which no full revolution is possible.

Embodiments of the inventive method can lead to a significant improvement in an angular misalignment of an rotation angle sensor with manageable computing expenditure. Requiring only manageable computing expenditures, enables the inventive method being integrated on a sensor with manageable efforts. Furthermore, the described methods are able to compensate aging-related errors as correction values are determined on actual measurement signal values instead of values determined once, e.g. during a calibration routine after manufacturing.

In the following, an embodiment of the inventive method is described making reference to FIG. 6. FIG. 6 shows a determination scheme for determining four rotation angle values and the associated measurement signal values, wherein two of the rotation angle values are used for determining amplitude correction values.

Figure 4:
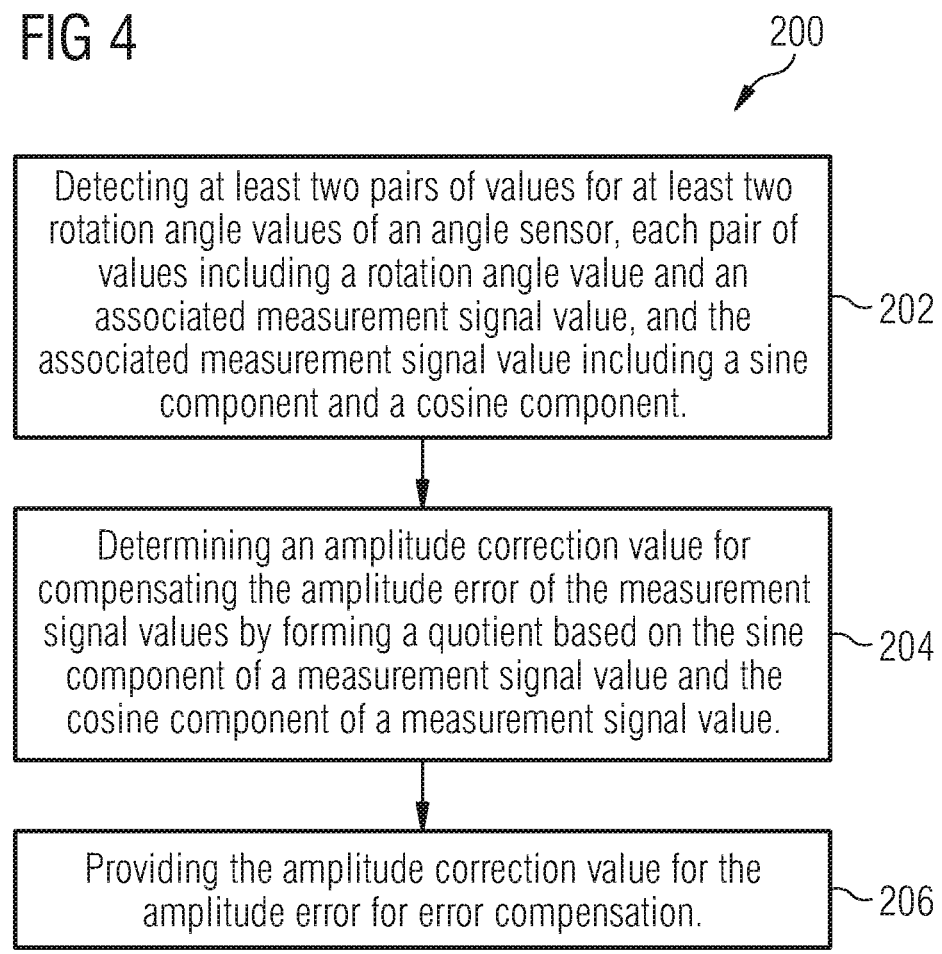
FIG. 4 shows a flowchart of a method for determining amplitude correction values for an error compensation in an angle sensor according to an embodiment.

FIG. 4 shows a flowchart of a method 200 for determining amplitude correction values for an error compensation in an angle sensor. In a step 202 at least two pairs of values for at least two rotation angle values of an angle sensor are detected according to the scheme described in FIG. 6. Each pair of values includes a rotation angle value and an associated measurement signal value, wherein the associated measurement signal value includes a sine component and a cosine component. In the following details are described making reference to the angles $\alpha_1$ and $\alpha_2$ in FIG. 6. In a next step 204 an amplitude correction value for compensating the amplitude error of the measurement signal values is determined by forming a quotient based on the sine component of a measurement signal value and the cosine component of a measurement signal value. $\alpha_2$ depends on $\alpha_1$ in terms of $\alpha_2 = \alpha_1 - 90°$. Therefore, a result of the sine function and therefore an error-free sine component for $\alpha_1$ equals mathematically a result of a cosine function and therefore an error-free cosine component of $\alpha_2$ and vice versa. Forming a quotient of a sine component and a cosine component enables to quantify a present amplitude error, e.g. for further error compensation. The quantification of the present amplitude error in terms of forming the quotient may normalize the amplitude error with respect to the sine or the cosine component. In a next step 206 the amplitude correction value for the amplitude error is provided for error compensation.

In the following, an embodiment for determining sine or cosine correction values and amplitude correction values for an error compensation in an angle sensor is described making reference to FIGS. 1, 4 and 6. FIG. 1 shows a flowchart of a method for determining sine or cosine correction values by detecting at least three pairs of values for at least three rotation angle values. FIG. 4 shows a flowchart of a method for determining amplitude correction values by detecting at least two pairs of values for at least two rotation angle values. FIG. 6 shows a determination scheme for determining four rotation angle values and the associated measurement signal values. Both methods can be combined to obtain both, the correction values for the offset errors of the sine and cosine components and the amplitude correction value for the amplitude error, wherein one pair of values for one rotation angle value is used for both, the determination of the sine or cosine correction value and the determination of the amplitude correction values. Such a combined method requires at least four pairs of values for at least four rotation angle values of an angle sensor.

Figure 5:
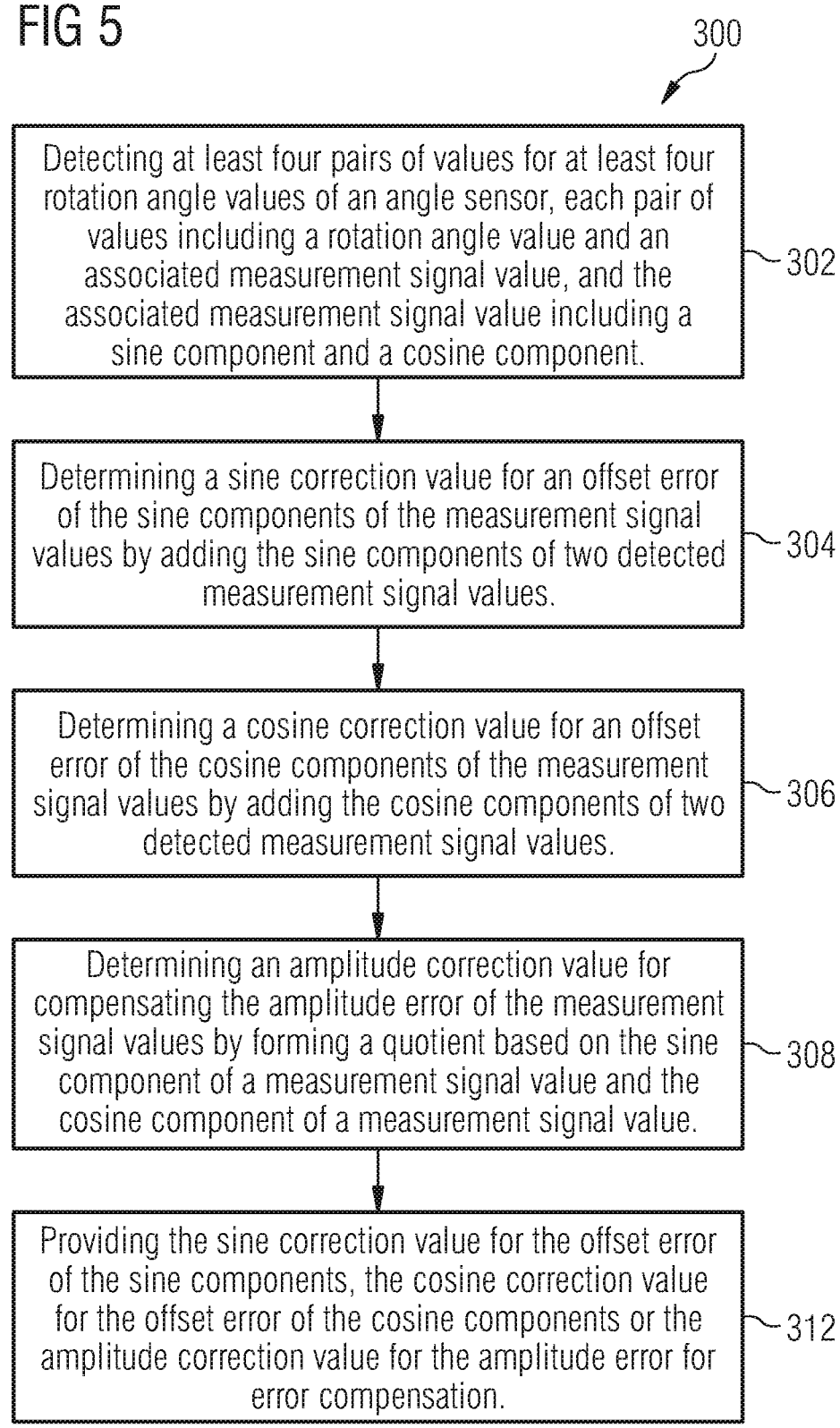
FIG. 5 shows a flowchart of a method for determining sine or cosine correction values and amplitude correction values for an error compensation in the angle sensor and combining the methods of FIG. 1 and FIG. 4.

FIG. 5 shows a flowchart of a method 300 for determining sine or cosine correction values and amplitude correction values for an error compensation in the angle sensor. At 302, four pairs of values for at least four rotation angle values of the angle sensor are detected according to the scheme described in FIG. 6. Each pair of values includes a rotation angle value and an associated measurement signal value, wherein the associated measurement signal value includes a sine component and a cosine component. According to 104 of method 100, at 304 the sine correction value for an offset error of the sine components of the measurement signal values is determined by adding the sine components of two detected measurement signal values. At 306 and according to 106 of method 100, the cosine correction value for the offset error of the cosine components of the measurement signal values is determined by adding the cosine components of two detected measurement signal values. As four measurement signal values have been detected, at 308, a determination of the amplitude correction value for compensating the amplitude error of the measurement signal values can be performed by forming the quotient based on the sine component of a measurement signal value and the cosine component of a measurement signal value according to 204 of method 200. At 312, the determined sine or cosine correction values for the offset error or the amplitude correction value of the amplitude error is provided for error compensation.

Making reference to FIG. 6, the measurement signal values of three rotation angles, namely $\alpha_1$, $\alpha_3$ and $\alpha_4$ are used for determining the sine or cosine correction value. The measurement signal values of two rotation angles, namely $\alpha_1$ and $\alpha_2$ are used to determining the amplitude correction value, wherein $\alpha_2$ is used for determining both, the sine or cosine correction value and the amplitude correction value.

With this method 300, combining methods 100 and 200, by determining four pairs of values for at least four rotation angle values instead of at least five pairs of values, three for determining sine or cosine correction values and two for determining amplitude correction values, fewer steps with respect to determining rotation angle values of the angle sensor have to be performed in case both, the offset error and the amplitude error shall be compensated.

FIG. 6 shows a determination scheme for determining four rotation angle values and the associated measurement signal values. For obtaining measurement signal values, test angles $\alpha_{1-4}$ are determined. A first test angle $\alpha_1$ is selected to approximately 22 degrees and therefore within a range from 10 degrees to 40 degrees. Due to manufacturing reasons this test angle may be at any position of the permanent magnet of the angle sensor with respect to the sensor element. The location of this test angle (and, thus, of any test angles) depends on the geometric position of the rotatable permanent magnet in relation to the sensor element and, thus, is unspecified until the module has been fully assembled. Measuring the associated measurement signal value returns a sine component 36-1 and a cosine component 38-1, wherein the sine component 36-1 and the cosine component 38-1 both contain errors. A second test angle $\alpha_2$ is derived from $\alpha_1$ by the equation $\alpha_2 = 90$ degrees$-\alpha_1$ and is therefore approximately 68 degrees and symmetrical to $\alpha_1$ with respect to 45 degrees. Measuring the associated measurement signal value of the test angle $\alpha_2$ returns a sine component 36-2 and a cosine component 38-2. A third test angle $\alpha_3$ is derived from $\alpha_1$ by the equation $\alpha_3 = 180$ degrees$-\alpha_1$ and is therefore approximately 158 degrees and symmetrical to $\alpha_1$ with respect to 90 degrees. Measuring the associated measurement signal value of the test angle $\alpha_3$ returns a sine component 36-3 and a cosine component 38-3. A fourth test angle $\alpha_4$ is derived from $\alpha_1$ by the equation $\alpha_4 = 180$ degrees$+\alpha_1$ and is therefore approximately 202 degrees and symmetrical to $\alpha_3$ with respect to 180 degrees. Measuring the associated measurement signal value of the test angle $\alpha_4$ returns a sine component 36-4 and a cosine component 38-4. Due to this procedure, the test angles $\alpha_{1-4}$ are within an interval of 180 degrees.

Within 106, the cosine correction value for the offset error of the cosine components is determined by adding the cosine components 38-1 and 38-3. As it can be seen, both cosine components 38-1 and 38-3 comprise an algebraic sign, different from each other due to the angles $\alpha_1$ and $\alpha_3$ being symmetrically with respect to 90 degrees, which leads the cosine components 38-1 and 38-3 comprising identically amplitudes with different algebraic signs in an error-free state. The addition of the cosine components 38-1 and 38-3 results zero in the error-free state and in a cosine correction value which is close to the offset error of the cosine components for cases in which the measurement signal values contain errors. Thus, the magnitudes of the cosine components 38-1 and 38-3 comprise the same offset which is compensated by the steps elucidated above.

The correction value for the offset error of the sine components is determined by adding the sine component 36-3 and 36-4. As it can be seen in FIG. 6, the sine components 36-3 and 36-4 comprise an algebraic sign which is different from each other due to the angles $\alpha_3$ and $\alpha_4$ being symmetrical with respect to 180 degrees. An addition of the sine components 36-3 and 36-4 results in the sine correction value for the sine components which is close to the offset error of the sine components. For determining both the sine correction value and the cosine correction value, the sine component 36-3 of the test angle $\alpha_3$ the sine component 36-4 of the test angle $\alpha_4$, the cosine component 38-1 of the test angle $\alpha_1$ and the cosine component 38-3 of the cosine component 38-3 and therefore, in sum three test angles $\alpha_1$, $\alpha_3$ and $\alpha_4$ are used. The correction values for the cosine components and the sine components have the same algebraic sign as the respective unknown offset error, but are smaller in terms of magnitude.

The amplitude correction value for the amplitude error is determined by dividing the sine component 36-2 by the cosine component 38-1. As both, the sine component 36-2 and the cosine component 38-1, comprise the same algebraic sign, the amplitude error is a positive value and, as the measurement signal values of the test angle $\alpha_1$ and of the test angle $\alpha_2$ are used to determine the amplitude correction value, two test angles are required as described in FIG. 4.

As the test angles $\alpha_1$ and $\alpha_2$ are symmetrically with respect to 45 degrees, the sine component 36-2 and the cosine component 38-1 comprise an equivalent amplitude in the error-free state. The measurement signal values containing errors, comparing both, the sine 36-2 and the cosine component 38-1 with each other by dividing them, leads to the amplitude correction value.

The above described procedure describes an embodiment which is limited to the case of $\alpha_1$ being greater or equal 10 degrees and smaller or equal 40 degrees.

To summarize, a combined method based on the methods 100 and 200 is based on a comparison of the sine and cosine components of four or more test angles for determining the deviation of the output signals from the ideal, error-free state.

In further embodiments, the test angle $\alpha_1$ is an angle which ranges from 10 degrees to 40 degrees or from 50 degrees to 80 degrees. The limits of the according ranges comprise a distance of 10 degrees with respect to the ordinate and the abscissa of the polar coordinate system defined by the axis describing the amplitude of the sine components and the axis describing the amplitude of the cosine components of the measurement signal values. In further embodiments the test angle $\alpha_1$ is located in the corresponding ranges in one of the other three quadrants of the ellipse defined by the ordinate and abscissa defining amplitudes of the sine and cosine components of the signal measurement values, while the test angles $\alpha_{2-4}$ are derived from $\alpha_1$ maintaining the above describes symmetry. The test angle $\alpha_1$ is selected so that all of the test angles required for providing the correction values to be determined are located within the range of angles to be covered by the angle sensor, which is predefined by the application. During a complete sweep of the application and therefore of the range of angles, the output signals are stored at the predefined test angles and the correction values are calculated in accordance with the model described above.

A sine function of a rotation angle value comprising a minor gradient at rotation angle values near zero degrees and a cosine function of the rotation angle value comprising a minor gradient at rotation angle values near 90 degrees enables the method to comprise a mathematical robustness. The mathematical robustness enables the test angles $\alpha_{1-4}$ to be symmetric according to the above described scheme within a tolerance range of three degrees.

A sine or cosine correction value for a sine or cosine error of the measurement signal value determined by a method making reference to FIG. 1 can be used to correct the sine or cosine offset error of the measurement signal values. In the following a method for correcting the sine or a cosine offset error in measurement signal values of an angle sensor is described making reference to FIG. 1. FIG. 1 shows a flowchart of a method for determining sine or cosine correction values for an error compensation in an angle sensor.

Figure 7:
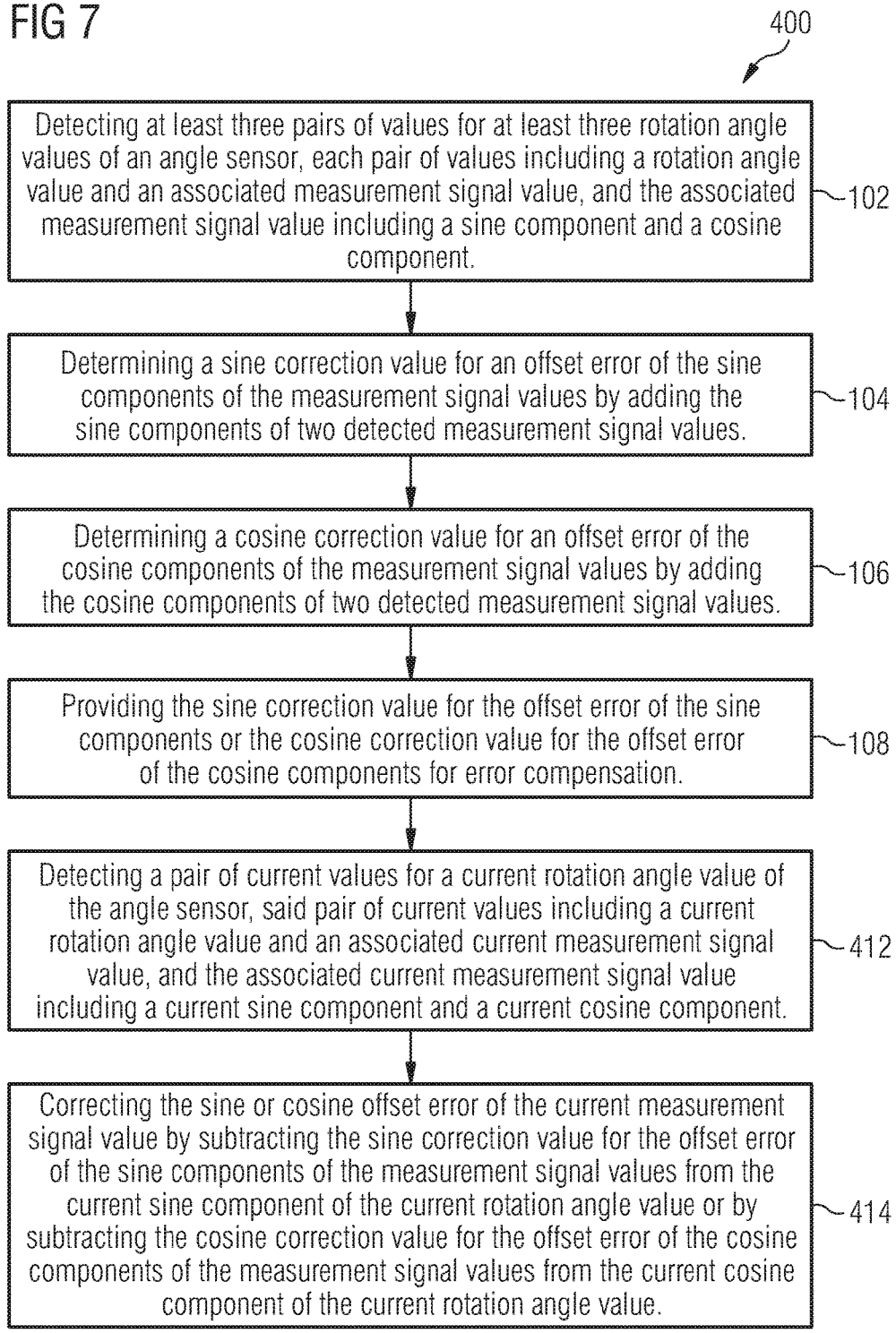
FIG. 7 shows a flowchart of a method for correcting a sine or a cosine offset error in measurement signal values of an angle sensor according to an embodiment.

FIG. 7 shows a flowchart of a method 400 for correcting a sine or a cosine offset error in measurement signal values of an angle sensor. The first four steps of method 400 are equal to 102, 104, 106 and 108 of method 100. At 412 a pair of current values for a current rotation angle value of the angle sensor is detected for correction. The detection can be performed on the fly and during operation of the angle sensor in its application. The pair of current values includes a current rotation angle value and an associated current measurement signal value. The associated current measurement signal value includes a current sine component and a current cosine component. At 414 the sine or cosine offset error of the current measurement signal value is corrected by subtracting the sine correction value for the offset error of the sine components of the measurement signal values from the current sine component of the current rotation angle value or by subtracting the cosine correction value for the offset error of the cosine components of the measurement signal values from the current cosine component of the current rotation angle value. To reduce both, the sine offset error and the cosine offset error, the sine correction value is subtracted from the sine component of the current measurement signal value and the cosine correction value is subtracted from the current cosine component of the current measurement signal value, which can be done during signal processing of the angle sensor. Repeated application of the method 400 thus leads to an almost complete compensation of the sine offset error and the cosine offset error.

An amplitude correction value for an amplitude error of the measurement signal value determined by a method making reference to FIG. 4 can be used to correct the amplitude error of the measurement signal values. In the following a method for correcting the amplitude error in measurement signal values of an angle sensor is described making reference to FIG. 4. FIG. 4 shows a flowchart of a method for determining amplitude correction values for an error compensation in an angle sensor.

Figure 8:
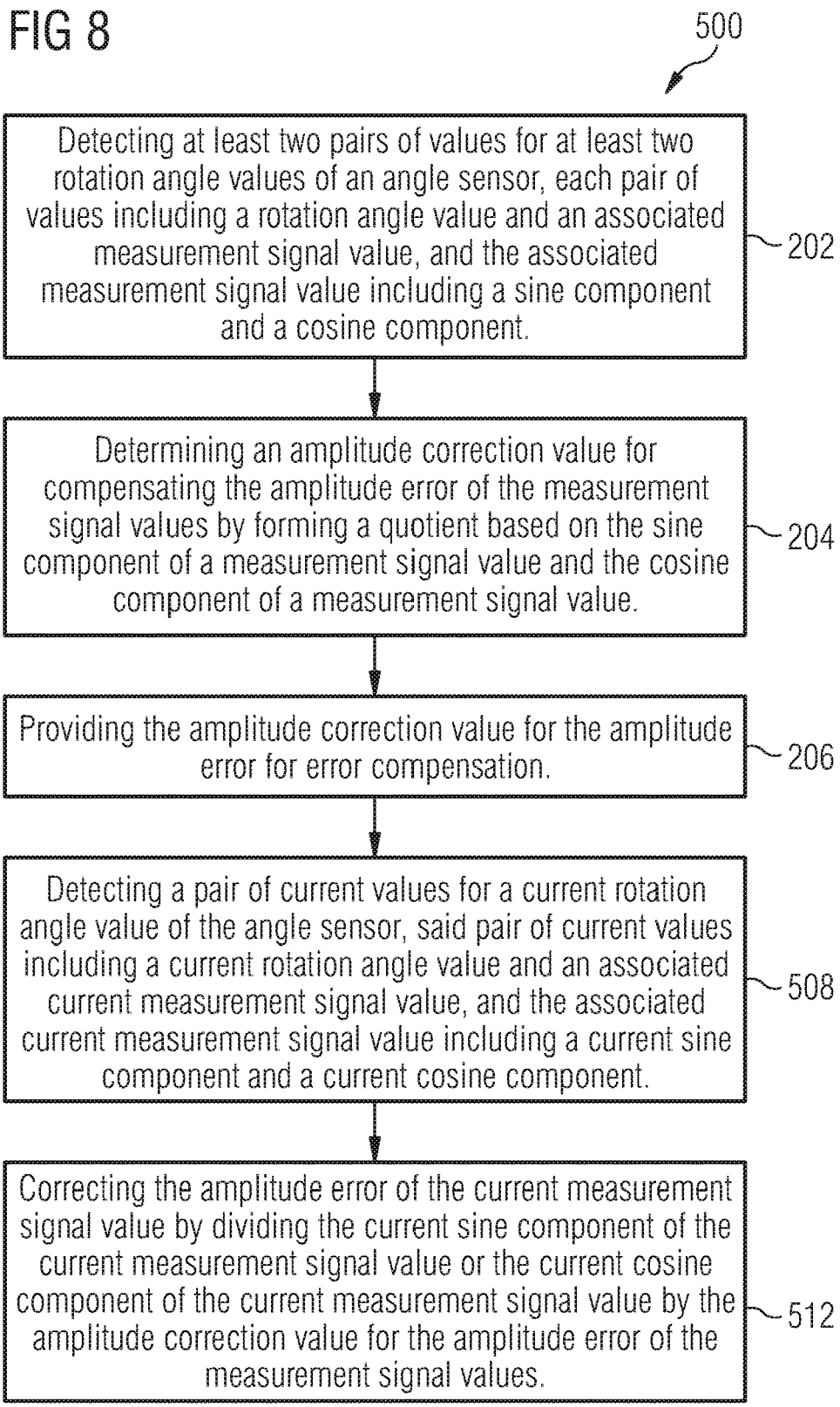
FIG. 8 shows a flowchart of a method for correcting an amplitude error in measurement signal values of an angle sensor according to an embodiment.

FIG. 8 shows a flowchart of a method 500 for correcting an amplitude error in measurement signal values of an angle sensor. The first three steps of method 500 are equal to 202, 204 and 206 of method 200. At 508 a pair of current values for a current rotation angle value of the angle sensor is detected for correction. The detection can be performed on the fly during operation of the sensor in its application. The pair of current values includes a current rotation angle value and an associated current measurement signal value. The associated current measurement signal value includes a current sine component and a current cosine component. At 512 the amplitude error of the current measurement signal value is corrected by dividing the current sine component of the current measurement signal value or the current cosine component of the current measurement signal value by the amplitude correction values for the amplitude error of the measurement signal values.

In embodiments, the sine component of the current measurement signal value is divided by the amplitude correction value for the amplitude error of the measurement signal value during signal processing subsequently to the correction of the sine and cosine offset errors, whereby the amplitude error is compensated by the division.

In alternative embodiments, the offset error of sine and/or cosine components is corrected subsequently to the correction of the amplitude error.

In other embodiments, in order to avoid oscillations, which may be caused by signal noise, a current and therefore new sine or cosine correction value for the sine or cosine offset error is are multiplied, prior to subtraction from the measurement values to be corrected, with an attenuation factor smaller than one and the result added to the result of a multiplication of an existing corresponding correction value with the subtraction of the attenuation factor from one during signal processing. Accordingly, the amplitude correction value may also be affected by means of corresponding attenuation, in accordance with the formula:

$$CV = (1-a) \times CV_{old} + a \times CV_{new}$$

where a is the attenuation factor and CV is a sine or a cosine correction value for the sine or cosine offset error, the amplitude correction value for the amplitude error respectively. Thus, the angle error of the sensor may be reduced to half the uncompensated value within typically about ten repetitions of the method.

Methods 400 for correcting a sine or a cosine offset error in measurement signal values as described in FIG. 7 and method 500 for correcting an amplitude error in measurement signal values of an angle sensor as described in FIG. 8 describe each a method for determining correction values which can be used in calibration routines, and which require no measurement of the maxima and minima of the sine and cosine components of associated measurement signal values. Instead, the associated measurement signal values of at least two test angles for determining the amplitude correction value, of at least three test angles for determining the sine and/or the cosine offset error, of at least four test angles for determining the sine and/or cosine correction values and the amplitude correction value located within a range of angles of 180 degrees are measured and, on the basis of this measurement, offset and amplitude errors are corrected step by step during operation of the sensor. An advantage of method 400 and 500 is that it can be applied for angle sensor for which, for application-related reasons, no full rotation of the sensor element of the angle sensor with respect to the source of the magnetic field is possible, but which sweep over a range of angles of 180 degrees or more. Since angle sensors which are based on the AMR internally measure the double magnetic-field angle due to the physical effect, a range of angles of 90 degrees or more will accordingly suffice for them. Methods 400 and 500 are also configured to correct offset and amplitude errors which vary by time, e.g. due to aging effects.

Figure 9:
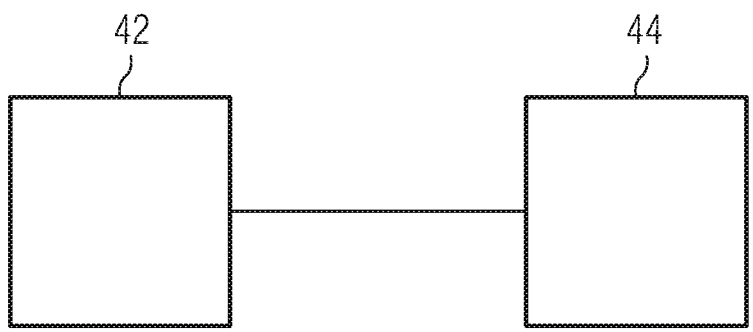
FIG. 9 shows a block diagram of a rotation angle sensor arrangement according to an embodiment.

FIG. 9 shows a block diagram of a rotation angle sensor arrangement, comprising a rotation angle sensor 42 and a processing unit 44. The rotation angle sensor 42 is configured to detect at least three pairs of values for at least three rotation angle values of an angle sensor. Each pair of rotation angle values includes a rotation angle value and an associated measurement signal value. The associated measurement signal value includes a sine component and a cosine component. The processing unit 44 is configured to perform error compensation in angle sensors based on the at least three pairs of values according to method 400.

Further embodiments show rotation angle sensors comprising a memory device, wherein a rotation angle is stored or a communication interface for communicating with such a memory device. The stored rotation angle is configured to be a base for test angles derived from the stored rotation angle.

Figure 10:
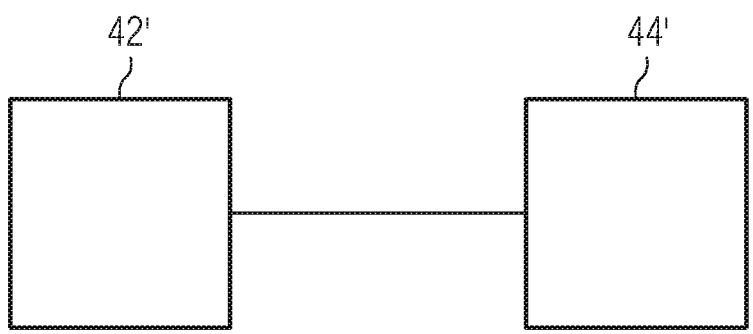
FIG. 10 shows a rotation angle sensor arrangement, comprising a rotation angle sensor according to an embodiment.

FIG. 10 shows a rotation angle sensor arrangement, comprising a rotation angle sensor 42' configured to detect at least two pairs of values for at least two rotation angle values of an angle sensor. Each pair of rotation angle values includes a rotation angle value and an associated measurement signal value. The associated measurement signal value includes a sine component and a cosine component. The processing unit 44' is configured to perform error compensation in angle sensors according to the method 500.

Further embodiments comprise a memory device wherein a first rotation angle is stored, a communication interface for communicating with such a memory device respectively. The stored rotation angle is configured to be a base for test angles derived from the stored rotation angle.

Figure 11A:
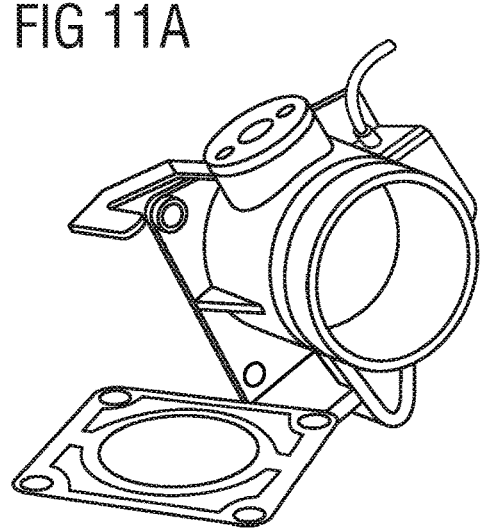
FIG. 11a shows an exemplary picture of an embodiment in terms of a throttle valve.

FIG. 11a shows an exemplary picture of an embodiment in terms of a throttle valve, comprising an angle sensor.

Figure 11B:
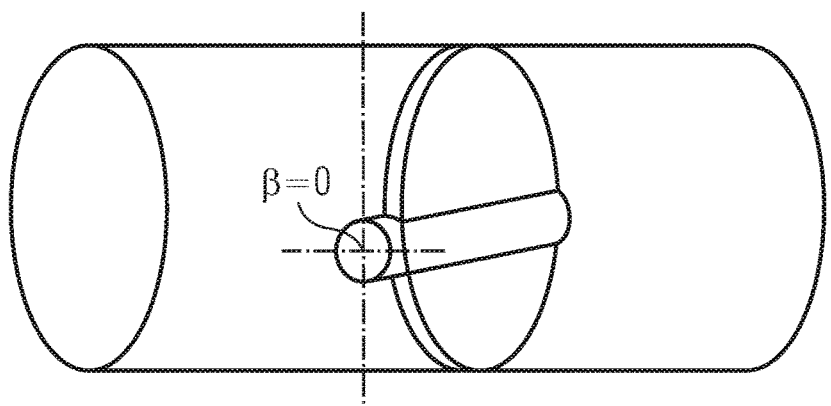

FIG. 11b shows a schematic diagram of the closed throttle valve of FIG. 11a, an opening angle β comprising 0 degrees.

Figure 11C:
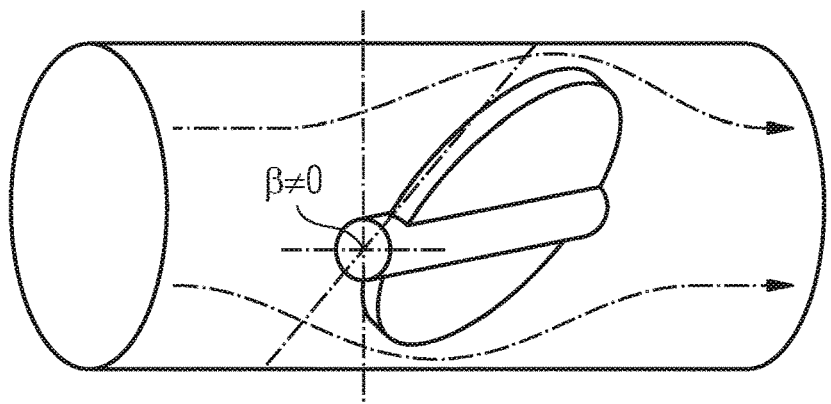
FIG. 11c shows a schematic diagram of the opened throttle valve according to the embodiment of FIGS. 11a and 11b.

FIG. 11c shows a schematic diagram of the opened throttle valve shown in FIGS. 11a and 11b, the opening angle β comprising an angle of more than 0 degrees but less than 90 degrees.

In throttle valves in an internal combustion engine, the mechanical range of angles is typically 0 degrees which corresponds to "valve is closed" to 90 degrees, which corresponds to "valve is open." Since with AMR-based sensors, double the angle is internally measured, this corresponds, within a sensor, to a range of angles of 180 degrees, which makes the methods applicable. For regulating the amount of fuel injected, it is necessary to precisely determine the valve position. If the throttle valve is opened and closed several times during operation, the current values can be measured and the corresponding corrections can be implemented during the opening and closing operations, as a result of which the angle error of the sensor is markedly reduced.

The mechanical opening angle β is independent from the test angles α of the angle sensor for determining correction values for offset or amplitude errors. As described above, angles α are dependent from the measurement signal values provided by the sensor and therefore from the orientation of the sensor element within the magnetic field of the sensor, which is provided for example by a permanent magnet. The angle β is dependent from the application of the sensor, e.g. the throttle valve. Usually, after mounting the sensor to the valve, the throttle valve is opened and closed while sensing the angles α of the sensor and the angles α of the sensor corresponding to the opening angles β of the throttle valve are stored in a memory device. Therefore the angle $\alpha_1$ is selected according to the above described scheme in a way that it is positioned within one of the intervals defined in FIG. 6 and in a way that the angles $\alpha_2$, $\alpha_3$ and/or $\alpha_4$ are within the operating range of the application.

Variations of the angle sensor over time, e.g. caused by aging effects, may be compensated by the above described methods.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A method for determining sine or cosine correction values for an error compensation in an angle sensor, comprising:
mounting the angle sensor to a valve;
causing the valve to rotate through a range of opening angles;
during rotation of the valve,
measuring, using the angle sensor, a measurement signal of the angle sensor and detecting at least three pairs of values for at least three different rotation angle values of the angle sensor, each pair of values including a rotation angle value and an associated measurement signal value, and the associated measurement signal value including a sine component and a cosine component;
measuring, using the angle sensor, a magnetic field at a location of the angle sensor;
determining a sine correction value for an offset error of the sine components of the measurement signal values by adding the sine component of a detected measurement signal value corresponding to a first rotation angle to the sine component of a detected measurement signal value corresponding to a second rotation angle using a processor;
determining a cosine correction value for an offset error of the cosine components of the measurement signal values by adding the cosine component of a detected measurement signal value corresponding to a first rotation angle to the cosine component of a detected measurement signal value corresponding to a second rotation angle using the processor; and
providing the sine correction value for the offset error of the sine components or the cosine correction value for the offset error of the cosine components for error compensation using the processor,
wherein the at least three pairs of values are received by the processor from the angle sensor configured to provide the sine component and the cosine component based on the measurement of the magnetic field at the location of the angle sensor and based on the rotation angle value;
correcting a subsequent measurement signal with the cosine correction value or the sine correction value; and
providing the corrected measurement signal for use in positioning the valve to regulate flow.

2. The method as claimed in claim 1, further comprising:
defining a first rotation angle value $\alpha_1$ within an interval of equal to or greater than 10 degrees and equal to or smaller than 40 degrees or within an interval of equal to or greater than 50 degrees and equal to or smaller than 80 degrees using the processor; and
defining a second rotation angle value DW2 by means of the equation $\alpha_2 = 90$ degrees$-\alpha_1$ using the processor; or
defining a fourth rotation angle value DW4 by means of the equation $\alpha_4 = 180$ degrees$+\alpha_1$ using the processor;
wherein a reference rotation angle, which defines a rotation angle value of zero degrees, describes a position of an angle sensor element configured to sense the orientation of the sensor element within a magnetic field in relation to the magnetic field.

3. The method as claimed in claim 1, further comprising:
detecting at least one further pair of values for at least one rotation angle value of the angle sensor, said pair of values including a rotation angle value and an associated measurement signal value, and the associated measurement signal value including a sine component and a cosine component using the processor;
determining an amplitude correction value for compensating the amplitude error of the measurement signal values by forming a quotient based on the sine component of a measurement signal value and the cosine component of a measurement signal value using the processor; and
providing the amplitude correction value for the amplitude error for error compensation using the processor.

4. The method as claimed in claim 1, further comprising:
determining an attenuation factor within a range from zero to 1 using the processor;
taking the sine or cosine correction value as a first sine or cosine correction value for the offset error of the sine or cosine components using the processor;
forming a first portion of an attenuated sine or cosine correction value by weighting the first sine or cosine correction value or an existing attenuated sine or cosine correction value with a factor corresponding to a subtraction of the attenuation factor from a value of 1 using the processor;

determining a second sine or cosine correction value for the offset error of the sine or cosine components using the processor;

forming a second portion of the attenuated sine or cosine correction value by weighting the second sine or cosine correction value or the attenuated sine or cosine correction value with the attenuation factor using the processor; and forming the attenuated sine or cosine correction value by adding the first portion and the second portion of the respective attenuated sine or cosine correction value using the processor.

5. The method of claim 1, further comprising:

detecting a pair of current values for a current rotation angle value of the angle sensor, said pair of current values including a current rotation angle value and an associated current measurement signal value, and the associated current measurement signal value including a current sine component and a current cosine component using the processor; and correcting the sine or cosine offset error of the current measurement signal value by subtracting the sine correction value for the offset error of the sine components of the measurement signal values from the current sine component of the current rotation angle value or by subtracting the cosine correction value for the offset error of the cosine components of the measurement signal values from the current cosine component of the current rotation angle value using the processor.

6. The method according to claim 4, wherein the attenuated sine or cosine correction value is formed using the processor based on the determination rule $$CV=(1-a) \times CVold + a \times CVnew,$$

wherein a is the attenuation factor, wherein CV is the attenuated sine or cosine correction value for the sine or cosine offset error, wherein CVold is the first sine or cosine correction value and wherein CVnew is the second sine or cosine correction value.

7. A method for determining amplitude correction values for an error compensation in an angle sensor, comprising:

mounting the angle sensor to a valve;

causing the valve to rotate through a range of opening angles;

during rotation of the valve, measuring, using the angle sensor, a measurement signal of the angle sensor and detecting at least two pairs of values for at least two different rotation angle values of the angle sensor, each pair of values including a rotation angle value and an associated measurement signal value, and the associated measurement signal value including a sine component and a cosine component;

measuring, using the angle sensor, a magnetic field at a location of the angle sensor;

determining an amplitude correction value for compensating the amplitude error of the measurement signal values by forming a quotient between the sine component of a measurement signal value corresponding to a first rotation angle value and the cosine component of a measurement signal value corresponding to a second rotation angle value using a processor; and providing the amplitude correction value for the amplitude error for error compensation using the processor, wherein the at least two pairs of values are received by the processor from the angle sensor configured to provide the sine component and the cosine component based on the measurement of the magnetic field at the location of the angle sensor and based on the rotation angle value;

correcting a subsequent measurement signal with the amplitude correction value; and providing the corrected measurement signal for use in positioning a valve to regulate flow.

8. The method as claimed in claim 7, further comprising:

defining a first rotation angle value $\alpha_1$ within an interval of equal to or greater than 10 degrees and equal to or smaller than 40 degrees or within an interval of equal to or greater than 50 degrees and equal to or smaller than 80 degrees; and defining a second rotation angle value $\alpha_2$ by means of the equation $\alpha_2 = 90$ degrees $- \alpha_1$;

wherein a reference rotation angle, which defines a rotation angle value of zero degrees, describes a position of an angle sensor element configured to sense the orientation of the sensor element within a magnetic field in relation to the magnetic field.

9. The method as claimed in claim 7, further comprising:

determining a sine correction value for an offset error of the sine components of the measurement signal values by adding the sine components of two detected measurement signal values using the processor;

determining a cosine correction value for an offset error of the cosine components of the measurement signal values by adding the cosine components of two detected measurement signal values using the processor; and providing the sine correction value for the offset error of the sine components or the cosine correction value for the offset error of the cosine components for error compensation using the processor.

10. The method as claimed in claim 7, further comprising:

determining an attenuation factor within a range from zero to 1 using the processor;

taking the amplitude correction value as a first amplitude correction value for an amplitude error using the processor;

forming a first portion of an attenuated amplitude correction value by weighting the first amplitude correction value or an attenuated amplitude correction value with a factor corresponding to a subtraction of the attenuation factor from a value of 1 using the processor;

determining a second amplitude correction value for the amplitude error using the processor;

forming a second portion of the attenuated amplitude correction value by weighting the second amplitude correction value or the attenuated amplitude correction value with the attenuation factor using the processor; and forming the attenuated amplitude correction value by adding the first portion and the second portion of the respective attenuated amplitude correction value using the processor.

11. The method according to claim 7, further comprising:

detecting a pair of current values for a current rotation angle value of the angle sensor, said pair of current values including a current rotation angle value and an associated current measurement signal value, and the associated current measurement signal value including a current sine component and a current cosine component using the processor; and correcting the amplitude error of the current measurement signal value by dividing the current sine component of the current measurement signal value or the current cosine component of the current measurement signal value by the amplitude correction value for the amplitude error of the measurement signal values using the processor.

12. The method according to claim 10, wherein the attenuated amplitude correction value is formed based on the determination rule $$CV = (1-a) \times CVold + a \times CVnew$$

wherein a is the attenuation factor, wherein CV is the attenuated amplitude correction value, wherein CVold is the first amplitude correction value and wherein CVnew is the second amplitude correction value.

13. A method for determining sine or cosine correction values and amplitude correction values for an error compensation in an angle sensor, comprising:
   mounting the angle sensor to a valve;
   causing the valve to rotate through a range of opening angles;
   during rotation of the valve, measuring, using the angle sensor, a measurement signal of the angle sensor and detecting at least four pairs of values for at least four different rotation angle values of an angle sensor, each pair of values including a rotation angle value and an associated measurement signal value, and the associated measurement signal value including a sine component and a cosine component;
   determining a sine correction value for an offset error of the sine components of the measurement signal values by adding the sine component of a detected measurement signal value corresponding to a first rotation angle to the sine component of a detected measurement signal value corresponding to a second rotation angle using a processor;
   determining a cosine correction value for an offset error of the cosine components of the measurement signal values by adding the cosine component of a detected measurement signal value corresponding to a first rotation angle to the cosine component of a detected measurement signal value corresponding to a second rotation angle using the processor;
   determining an amplitude correction value for compensating the amplitude error of the measurement signal values by forming a quotient based on the sine component of a measurement signal value and the cosine component of a measurement signal value using the processor; and
   providing the sine correction value for the offset error of the sine components, the cosine correction value for the offset error of the cosine components or the amplitude correction value for the amplitude error for error compensation using the processor; and
   correcting a subsequent measurement signal with the sine correction value or the cosine correction value; and
   providing the corrected measurement signal for use in positioning the valve to regulate flow.

14. The method as claimed in claim 13, further comprising:
   defining a first rotation angle value $\alpha_1$ within an interval of equal to or greater than 10 degrees and equal to or smaller than 40 degrees or within an interval of equal to or greater than 50 degrees and equal to or smaller than 80 degrees;
   defining a second rotation angle value DW2 by means of the equation $\alpha_2 = 90$ degrees $- \alpha_1$;
   defining a third rotation angle value $\alpha_3$ by means of the equation $\alpha_3 = 180$ degrees $- \alpha_1$;
   defining a fourth rotation angle value DW4 by means of the equation $\alpha_4 = 180$ degrees $+ \alpha_1$; and
   wherein a reference rotation angle, which defines a rotation angle value of zero degrees, describes a position of an angle sensor element configured to sense the orientation of the sensor element within a magnetic field in relation to the magnetic field.

15. The method as claimed in claim 13, further comprising:
   determining an attenuation factor within a range from zero to 1 using the processor;
   taking the sine, cosine or amplitude correction value as a first sine, cosine or amplitude correction value for a sine or cosine offset error or an amplitude error using the processor;
   forming a first portion of an attenuated sine, cosine or amplitude correction value by weighting the first sine, cosine or amplitude correction value or an attenuated sine, cosine or amplitude correction value with a factor corresponding to a subtraction of the attenuation factor from a value of 1 using the processor;
   determining a second sine, cosine or amplitude correction value for the sine or cosine offset error or the amplitude error using the processor;
   forming a second portion of the attenuated sine, cosine or amplitude correction value by weighting the second sine, cosine or amplitude correction value or the attenuated sine, cosine or amplitude correction value with the attenuation factor using the processor; and
   forming the attenuated sine, cosine or amplitude correction value by adding the first portion and the second portion of the respective attenuated sine, cosine or amplitude correction value using the processor.

16. The method according to claim 15, wherein the attenuated sine, cosine or amplitude correction value is formed based on the determination rule $$CV = (1-a) \times CVold + a \times CVnew$$

wherein a is the attenuation factor, wherein CV is the attenuated sine, cosine or amplitude, wherein CVold is the first sine, cosine or amplitude correction value and wherein CVnew is the second sine, cosine or amplitude correction value.

17. A rotation angle sensor arrangement, comprising
   a rotation angle sensor configured to provide a sine component and a cosine component based on a measurement of a magnetic field at the location of the angle sensor and based on a rotation angle value, the rotation angle sensor configured to be mounted to a valve, and during rotation of the valve through a range of opening angles, detect at least three pairs of values for at least three different rotation angle values within an interval of 180 degrees of an angle sensor, each pair of values including a rotation angle value and an associated measurement signal value, and the associated measurement signal value including the sine component and the cosine component;
   a processor circuit configured to perform error compensation in angle sensors based on the at least three pairs of values by:
      determining a sine correction value for an offset error of the sine components of the measurement signal values by adding the sine component of a detected measurement signal value corresponding to a first rotation angle to the sine component of a detected measurement signal value corresponding to a second rotation angle;

determining a cosine correction value for an offset error of the cosine components of the measurement signal values by adding the cosine component of a detected measurement signal value corresponding to a first rotation angle to the cosine component of a detected measurement signal value corresponding to a second rotation angle; and providing the sine correction value for the offset error of the sine components or the cosine correction value for the offset error of the cosine components for error compensation;

correcting a subsequent measurement signal with the cosine correction value or the sine correction value; and providing the corrected measurement signal for use in positioning the valve to regulate flow.

18. The rotation angle sensor as claimed in claim 17, further comprising a memory device wherein a first rotation angle is stored, or a communication interface for communicating with such a memory device.

19. A rotation angle sensor arrangement, comprising a rotation angle sensor configured to provide a sine component and a cosine component based on a measurement of a magnetic field at the location of the angle sensor and based on a rotation angle value, the rotation angle sensor configured to be mounted to a valve, and during rotation of the valve through a range of opening angles, detect at least two pairs of values for at least two different rotation angle values within an interval of 180 degrees of an angle sensor, each pair of values including a rotation angle value and an associated measurement signal value, and the associated measurement signal value including a sine component and a cosine component;

a processor circuit configured to perform error compensation in angle sensors based on the at least two pairs of values by determining an amplitude correction value for compensating the amplitude error of the measurement signal values by forming a quotient between the sine component of a measurement signal value corresponding to a first rotation angle value received from the rotation angle sensor and the cosine component of a measurement signal value corresponding to a second rotation angle value received from the rotation angle sensor; and providing the amplitude correction value for the amplitude error for error compensation;

correcting a subsequent measurement signal with the amplitude correction value; and providing the corrected measurement signal for use in positioning a valve to regulate flow.

20. The rotation angle sensor as claimed in claim 19, further comprising a memory device wherein a first rotation angle is stored, or a communication interface for communicating with such a memory device.

* * * * *